UNITED STATES PATENT OFFICE.

CHARLES N. WAITE, OF MEDFORD, MASSACHUSETTS.

COMPOUND FOR PREPARING STARCH OR FLOUR SIZE FOR YARN, TEXTILE, OR OTHER FABRICS.

SPECIFICATION forming part of Letters Patent No. 351,890, dated November 2, 1886.

Application filed March 26, 1886. Serial No. 196,650. (No specimens.)

*To all whom it may concern:*

Be it known that I, CHARLES N. WAITE, of Medford, in the county of Middlesex and State of Massachusetts, have invented certain new and useful Improvements in Compounds for Neutralizing, Dissolving, and Softening Starch, of which the following is a specification.

My invention consists in an improved compound for neutralizing, dissolving, and softening starch or flour size for use on yarn or textile or other fabrics.

In carrying out my invention I employ about one-fourth of a pound of zinc oxide, one pound of crystallized sodium sulphate, five to six ounces of zinc chloride, and one hundred pounds of starch. This is boiled with from one hundred and fifty to three hundred gallons of water, according to the thickness of the size required.

While the above proportions are generally used, they are not necessarily adhered to in carrying out my invention, as the proportions may be varied to suit particular circumstances or various qualities or conditions of material to be treated. The zinc oxide neutralizes any organic or other acids which may be present in the starch and prevents the conversion of the starch into dextrine during the boiling and solution. Since starch has greater sizing and thickening power than dextrine, an economy is effected by the use of zinc oxide.

I find that when zinc oxide is used a given amount of starch will size from twenty-five to thirty per cent. more yarn than when starch only is used. I find also that a more perfect solution of starch is effected by the use of zinc oxide, allowing the size to penetrate to the interior of the yarn, and giving it greater strength and tenacity. The sodium sulphate is used to partially dissolve the zinc oxide and disseminate it through the body of the size.

I do not restrict myself to this substance, but might use an equivalent quantity of sodium chloride, ammonium chloride, ammonium sulphate, or other well-known solvent of zinc oxide. The zinc chloride is used to render the size soft and pliable when dry. The same object may be effected with glycerine, sulpholeate of soda, or other appropriate softener.

I am aware that sodium sulphate and zinc chloride have both been used in size. The novelty of my invention, however, resides in the perfect neutralization and solution of starch or flour with zinc oxide, which, while it has no alkaline reaction, has the property of completely neutralizing all acids.

For convenience in handling and transportation, I make a concentrated compound in the following proportions: about one-fourth of a pound of zinc oxide, one pound of sodium sulphate, five to six ounces of zinc chloride, and sufficient proportions of starch and water to hold the various ingredients together. This compound may be added to the quantity of starch and water requisite for size whenever desired.

I claim—

An improved compound for neutralizing, dissolving, and softening starch or flour size, consisting of zinc oxide combined with an appropriate solvent, to which is added an appropriate softener, as set forth.

In testimony whereof I have signed my name to this specification, in the presence of two subscribing witnesses, this 20th day of March, 1886.

CHARLES N. WAITE.

Witnesses:
C. F. BROWN,
A. D. HARRISON.